United States Patent [19]

Mori

[11] Patent Number: 4,467,346
[45] Date of Patent: Aug. 21, 1984

[54] ADAPTIVE QUANTIZER

[75] Inventor: Sumio Mori, Saitama, Japan

[73] Assignee: Fuji Photo Film Co., Ltd., Kanagawa, Japan

[21] Appl. No.: 356,545

[22] Filed: Mar. 9, 1982

[30] Foreign Application Priority Data

Mar. 11, 1981 [JP] Japan .................................. 56-34909

[51] Int. Cl.³ .............................................. H04N 9/32
[52] U.S. Cl. ......................................... 358/12; 358/13
[58] Field of Search ................. 358/13, 133, 138, 260, 358/75, 78

[56] References Cited

U.S. PATENT DOCUMENTS

| | | | |
|---|---|---|---|
| 4,133,006 | 1/1979 | Iinuma | 358/13 |
| 4,141,034 | 2/1979 | Netravali | 358/13 |
| 4,217,609 | 8/1980 | Hatori | 358/138 |
| 4,255,763 | 3/1981 | Maxemchuk | 358/138 |
| 4,366,507 | 12/1982 | Mori | 358/138 |
| 4,394,774 | 7/1983 | Widergren | 358/138 |

Primary Examiner—Michael A. Masinick
Attorney, Agent, or Firm—Sughrue, Mion, Zinn, Macpeak, and Seas

[57] ABSTRACT

An adaptative quantizer for use with color images separates each color component for separate quantization and breaks up the input image into a plurality of blocks. A quantization characteristic determining unit determines the characteristic to be used for a given block according to the distribution of quantization level values obtained when an estimation error in a preceding block is quantized according to a particular quantization characteristic. The characteristic may be changed when the distribution of quantization level values is smaller than or exceeds given threshold values.

7 Claims, 5 Drawing Figures

FIG. 2

| | QUANTIZATION CHARACTERISTIC | | | | | | | QUANT. STEP | CODE |
|---|---|---|---|---|---|---|---|---|---|
| | 1 | | 2 | | 3 | | 4 | | |
| | ESTIMATION ERROR | QUANT. LEVEL VALUE | ESTIMATION ERROR | QUANT. LEVEL VALUE | ESTIMATION ERROR | QUANT. LEVEL VALUE | ESTIMATION ERROR | QUANT. LEVEL VALUE | | |
| | 10 ~ | 13 | 20 ~ | 26 | 40 ~ | 52 | 80 ~ | 104 | 4 | 0 1 1 |
| | 5 ~ 9 | 7 | 10 ~ 19 | 14 | 20 ~ 39 | 28 | 40 ~ 79 | 56 | 3 | 0 0 1 |
| | 2 ~ 4 | 3 | 4 ~ 9 | 6 | 8 ~ 19 | 12 | 16 ~ 39 | 24 | 2 | 0 1 0 |
| | 0 ~ 1 | 0 | -1 ~ 3 | 0 | -3 ~ 7 | 0 | -7 ~ 15 | 0 | 1 | 0 0 0 |
| | -1 ~ -2 | -1 | -2 ~ -5 | -2 | -4 ~ -11 | -4 | -8 ~ -23 | -8 | 1' | 1 0 0 |
| | -3 ~ -5 | -4 | -6 ~ -11 | -8 | -12 ~ -23 | -16 | -24 ~ -47 | -32 | 2' | 1 1 0 |
| | -6 ~ -10 | -8 | -12 ~ -21 | -16 | -24 ~ -43 | -32 | -48 ~ -87 | -64 | 3' | 1 0 1 |
| | -11 ~ | -14 | -22 ~ | -28 | -44 ~ | -56 | -88 ~ | -112 | 4' | 1 1 1 |

21

ADAPTIVE QUANTIZER

BACKGROUND OF THE INVENTION

This invention relates to an estimation encoding system for efficiently transmitting or accumulating a picture image of variable density, and more particularly to an adaptive quantizer for controlling quantization characteristics according to variations in the input picture image for each of the color components of a color picture.

A variety of encoding band compression systems have been proposed in order to reduce transmission time and cost when a picture image of variable density is transmitted with a narrow bandwidth. A DPCM (differential pulse code modulation) system is well known as one of these systems. The compression effect is further improved, and the degradation in quality of an image due to gradient overload noise can be prevented, by using an adaptive quantization system which is developed from the DPCM system by considering the fact that the human visual characteristic is such that visual quality is lowered for a portion of a picture image where the variation is abrupt but the quality is sufficient for a portion of the picture image where the variation is moderate, so that a quantization characteristic having a coarse quantization level value is used when the input picture element values are large in variation, and a fine quantization characteristic is used when the input picture element values are small in variation; that is, the quantization characteristic is changed adaptively according to the variation of input picture element values.

A method of realizing this feature has been disclosed by Japanese Patent Application No. 38408/1980.

The principle of the method disclosed by Japanese Patent Application No. 38408/1980 will be described briefly. Based on the fact that, locally, a portion of a picture image is similar to those adjacent thereto, the picture image is divided into blocks having a suitable size, and according to the distribution of quantization level values in one block, a quantization characteristic is selected for the next block. Especially in the case where the blocks of a picture image are spatially adjacent to one another, one block is similar to the other blocks surrounding it. Therefore, the probability of selecting an erroneous quantization characteristic for the next block is very small. Furthermore, as the quantization level values of input picture elements are not monitored at all times, but monitored instead for one entire block, a quantization characteristic to be selected is shifted stably. Therefore, degradation of the image can be prevented, and the quantization characteristic can be selected correctly with high probability. Thus, the method has the effect that coding can be achieved with high efficiency.

This invention is intended to apply the adaptative quantizer disclosed by Japanese Patent Application No. 38408/1980 to a color picture, thereby to provide means for encoding a color picture with high efficiency. In the invention, a visual characteristic described below is utilized to selectively employ quantization characteristics. The human eye senses luminance such that it is sensitive to discontinuous variations in luminance as described above, but is insensitive to the magnitude of luminance difference in a region where the luminance changes abruptly (or a high frequency region) and sensitive to that in a region where the luminance changes moderately (or a low frequency region). The sensitivity to color depends on the extent of the area of an object such that as the area of an object is decreased, first blue and yellow sensitivities are lost and, as the area is further decreased, only brightness remains.

In other words, the human eye is sensitive to the variation in luminance in a color picture, insensitive to the magnitude of luminance difference and the color in a local region where the spatial frequency is high, and sensitive to the magnitude of luminance difference and the color in a local region where the spatial frequency is low.

SUMMARY OF THE INVENTION

This invention provides an adaptative quantizer in which, using the above-described visual characteristics, a color image signal is color-separated into a plurality of color components to obtain input picture element values. For each color component, an estimation error obtained from the input picture element value and an estimation value thereof is quantized adaptatively with a selected one of a plurality of quantization characteristics. According to the invention, the quantization characteristics provided for each color component have suitably determined quantization steps, and the input picture element is divided into blocks each consisting of a plurality of adjacent picture elements for each color component. The adaptive quantizer includes a quantization characteristic determining unit which determines a quantization characteristic to be used for one block, according to the distribution of quantization level values obtained when the estimation error in the previous block is quantized according to a previously selected quantization characteristic. The adaptive quantizer further includes a quantization characteristic selector for selecting, among the plurality of quantization characteristics, one which has been determined by the quantization characteristic detecting unit, and a quantizer for quantizing the estimation error in a relevant block by using the quantization characteristic which has been selected by the quantization characteristic selector. By means of this invention, the color picture is encoded with high compression while the degradation of the image is prevented.

BRIEF DESCRIPTION OF THE DRAWINGS

FIG. 2 is a table showing a plurality of quantization characteristics by way of example;

DETAILED DESCRIPTION OF THE PREFERRED EMBODIMENTS

Figure 5:
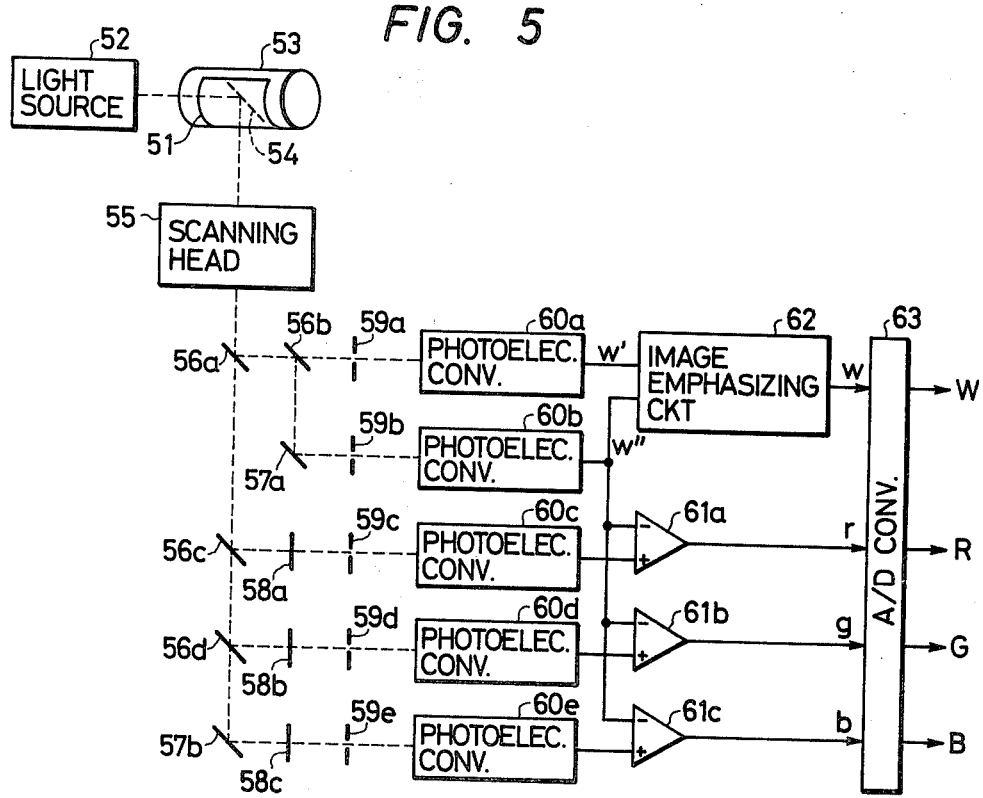
FIG. 5 is an explanatory diagram showing one example of an image input mechanism in which a color original is scanned to obtain input picture element values which are provided through color separation.

FIG. 5 shows a method in which a color original 51 is scanned to obtain color-separated input picture element values. The method will be briefly described since it is similar to that for a conventional color scanner. FIG. 5 includes: a light source 52; a rotary drum 53; a mirror 54; a scanning head 55; half mirrors 56a through 56d; mirrors 57a and 57b; color separating filters 58a through 58c; apertures 59a through 59e; photoelectric converters 60a through 60e; differential amplifiers 61a through 61c; an image emphasizing circuit 62; and an A/D (analog-to-digital) converter 63. The color original 51 is scanned to obtain color-separated input picture element values (a luminance component W, red component R, green component G and blue component B).

The effective diameter of the aperture 59a is several times as large as that of the aperture 59b, so that a blurred image is obtained. Thus, a luminance component W ($W = W' - k(W'' - W')$, where k is the emphasis parameter) emphasizing the details of an image can be obtained.

The aforementioned components (W, R, G and B) representative of brightness may be subjected to logarithmic conversion so as to be outputted as density components. Furthermore, the luminance component W (without being separated) may be included in the other components (R, G and B), so that only three color components (R, G and B) are outputted.

In the invention, a color picture is subjected to color separation for a plurality of components to thereby obtain input picture element values as described above, and the color picture is subjected to bandwidth compression in a parallel mode or in a serial mode for every color component according to the input picture element values thus obtained. In the invention, especially, adaptive quantization is carried out according to the color component of a color picture and the local spatial frequencies thereof, to perform high efficiency bandwidth compression.

For instance, quantization characteristics of finer quantization are employed for the luminance component than those of the other color components because of the human visual characteristic, as was described before. Among these quantization characteristics, one suitable for high and low spatial frequencies is employed.

As the luminance component affects the visual quality of the sensed image, it is desirable that the quantization characteristic selected causes no gradient overload noise and provides desired resolution. These same properties should be obtained for the other color components.

Now, an adaptive quantizer according to the invention will be described. For simplification in description, the invention will be described with reference to only one (the component W for instance) of the color components, in conjunction with the accompanying drawings.

Figure 1:
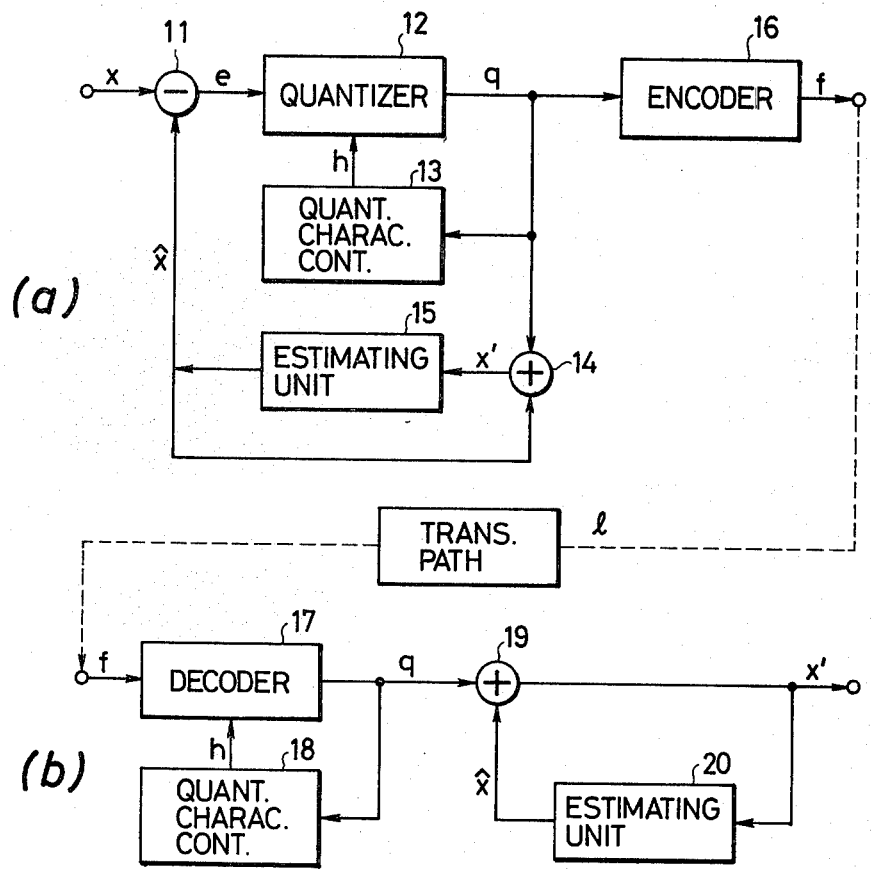
FIG. 1 is a block diagram showing an estimation encoding system employing an adaptive quantizer. More specifically, part (a) of FIG. 1 is a block diagram showing an encoding device, and part (b) is a block diagram showing a decoding device.

FIG. 1 is a block diagram showing the arrangement of a general estimation type coding system utilizing an adaptative quantizer, and showing the fundamental arrangement for practicing the invention. In FIG. 1, reference character (a) designates a coding device; and (b), a decoding device.

One of the color components W, R, G and B outputted by the circuit of FIG. 5 corresponds to an input picture element value x in FIG. 1.

A differencing unit 11 in FIG. 1 operates to calculates an estimation error e which is the difference between the present input picture element value x and an estimation value $\hat{x}$ which is obtained by estimating the present input picture element value from the past picture element value.

A quantizer 12 uses one of a plurality of quantization characteristics which have predetermined quantization step numbers and the quantization level values of the steps, to quantize the estimation error e according to its magnitude, to thereby output a quantization level value q.

A quantization characteristic controller 13 selects a suitable quantization characteristic according to the magnitude of the quantization level value q and supplies a quantization characteristic selection signal h to the quantizer 12. The quantizer 12 uses the quantization characteristic thus selected, to quantize the estimation error for the next picture element. The operation of the quantization characteristic controller 13 will be described later.

In an adder 14, the quantization level value q is added to the estimation value $\hat{x}$, so that a reproduction picture element value x' is provided for estimation of the next picture element value. The picture element value x' is different by as much as its quantization error from the input picture element value x.

An estimating unit 15 operates to estimate the next input picture element from a plurality of past reproduction picture element values x', to output an estimation value $\hat{x}$.

In this case, for instance, the following estimation equation is employed:

$$x = a_1 x'_{m,n-1} + a_2 x'_{m-1,n-1} + a_3 x'_{m-1,n} + a_4 x'_{m-1,n+1}$$

That is, a four-point estimation equation is used.

On the other hand, the quantization level value q is coded by an encoder 16 into a binary signal as defined in FIG. 2, and the binary signal is outputted as a signal f.

The output signal f is applied to the decoding unit through a transmission path l.

Referring to part (b) of FIG. 1, the signal f received by the decoding unit is decoded by a decoder 17 by a procedure opposite to that used by the aforementioned encoder 16, to provide the quantization level value q.

It should be noted that, even if signals f encoded have the same code, the quantization level value with respect to the code may be different depending on the quantization characteristics used.

Therefore, the decoder 17 operates to use one value, which is selected according to the preceding quantization level, among the plural quantization characteristics, to obtain a quantization level value. Selection of the quantization characteristic is carried out by a quantization characteristic controller 18, the operation of which is identical to the abovedescribed quantization characteristic controller 13.

On the other hand, an adder 19 operates to add the decoded quantization level value q to the estimation value $\hat{x}$ which is provided by estimating the present picture element value from the past reproduction picture element, to output a reproduction picture element value x'.

An estimating unit 20 uses a plurality of past reproduction picture element values to calculate an estimation value x for the next reproduction picture element value according to the aforementioned four-point estimation equation.

FIG. 2 shows a plurality of quantization characteristics and codes corresponding to the quantization level values thereof, by way of example.

In FIG. 2, reference numeral 21 designates the arbitrary numerical quantization characteristics. FIG. 2 shows four quantization characteristics.

The estimation error ranges, quantization level values and quantization steps of each quantization characteristic are shown merely for description, and should be set suitably as required.

In FIG. 2, three-bit fixed length codes are provided for the quantization level values; however, variable length codes suitable for entropy codes may be employed.

Figure 3:
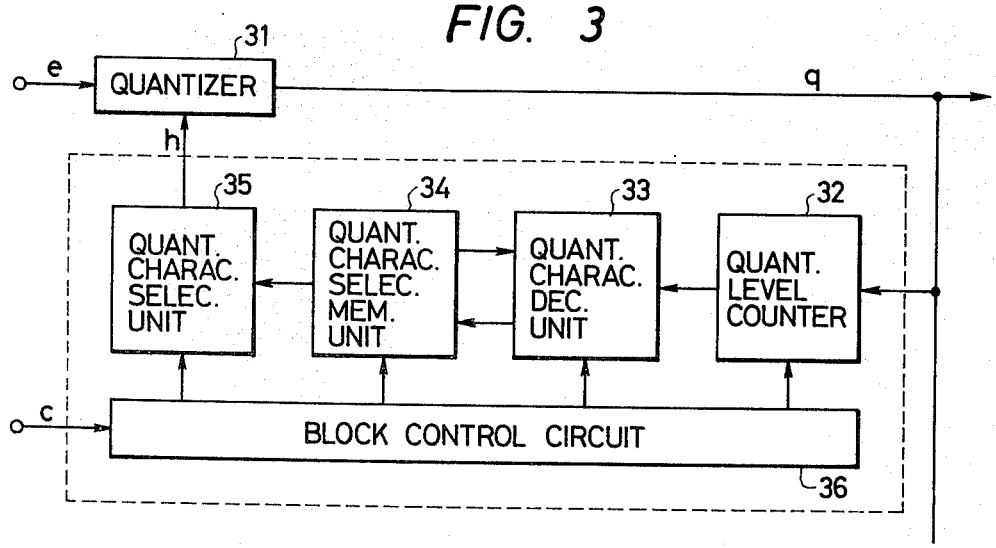
FIG. 3 is a block diagram showing one example of an adaptive quantizer according to this invention.

FIG. 3 shows one example of the adaptive quantizer according to the invention. For simplification in description, it is assumed that one line of an input image consists of 512 picture elements, sixteen (16) blocks each consisting of 32 picture elements.

In FIG. 3, reference numeral 31 designates a quantizer for quantizing an estimation error e; and 36, a block control circuit for counting clock pulses c which are generated in synchronization with input picture elements, to output a block address (1, 2, 3, ... 16) every time thirty-two clock pulses c are counted. More specifically, the block control circuit 36 has an initial value of 0 for each line, and outputs the block addresses (1, 2, 3 ... 16) sequentially each time thirty-two (32) clock pulses are counted.

A quantization characteristic selection memory unit 34 has sixteen memories in correspondence to the number of blocks in one line, in which are stored the quantization characteristic symbols of the respective blocks at the respective addresses.

A quantization level value counter 32 operates to investigate the distributions of successively inputted quantization level values in the relevant blocks. However, for simplification in description, it is assumed that the counter 32 counts only when the quantization level value is 0 in FIG. 2.

The quantization level value counter 32, being reset whenever the block address is renewed by the block control circuit 36, counts in succession only when the quantization level value is 0. The count value of the counter 32 is supplied to a quantization characteristic decision unit 33, so as to decide the quantization characteristic to be used for the same block in the next line. This will be described with reference to the following Table 1.

TABLE 1

| % h | to 50 | to 60 | to 70 | to 80 | to 90 | to 100 |
|---|---|---|---|---|---|---|
| 1 | 2 | 2 | 2 | 1 | 1 | 1 |
| 2 | 3 | 3 | 2 | 2 | 1 | 1 |
| 3 | 4 | 3 | 3 | ② | 2 | 2 |
| 4 | 4 | 4 | 3 | 3 | 2 | 2 |

In Table 1, the horizontal axis provides the percentages (%) of generation of the quantization level value 0 in the distribution of quantization levels in one block, and the vertical axis lists the numerical quantization characteristic symbols (h) used in the relevant blocks at present. In Table 1, each value represents a quantization characteristic symbol to be used in the same block of the next line. For instance if the percentage of production of the quantization level value 0 in a block is in the range from 71 to 80% and the quantization characteristic symbol 3 is used in the block, then the quantization characteristic symbol to be used in the same block of the next line is 2, as encircled in Table 1. This means that, as the current quantization characteristic is rough, a finer quantization characteristic will be used for the same block of the next line.

As is clear from the above description, referring to the count value of the quantization level value counter 32 which is provided for a current block and the quantization characteristic symbol which is provided in the quantization characteristic selection memory for the current block, the quantization characteristic decision unit 33 determines the quantization characteristic symbol to be used for the same block in the next line according to Table 1. The quantization characteristic symbol thus determined is stored, as the value for the same block of the next line, in the quantization characteristic selection memory, as specified by the relevant block address.

A quantization characteristic selector 35 receiving the quantization characteristic symbol addressed with (block address + 1) from the quantization characteristic selection memory unit 34, operates to supply the quantization characteristic symbol of the relevant block to be quantized to the quantizer 31 or to change the quantization characteristic so that the quantizer 31 can use a quantization characteristic corresponding to the quantization characteristic symbol.

The above-description can be summarized as follows: First, the quantization characteristic selection memory unit 34 selects a standard quantization characteristic for the first line and stores it in its sixteen memories, the number of which is equal to the number of blocks. Then, according to the distribution of the quantization level value which is obtained from the quantization characteristic which is used for the current block, a quantization characteristic is determined for the same block of the next line and is stored at the respective address of the quantization characteristic selection memory unit 34, so that for each block of each line, the estimation error is quantized by selectively employing the quantization characteristics which are obtained by referring to the quantization characteristic selection memory unit.

In the above-description, as the quantization level value 0 is counted for each block, the quantization characteristic to be used for the same block of the next line is determined. However, the following method may be employed: The quantization level value counter 32 may be provided with buffer memories, the number of which is equal to the number of blocks, so that count values corresponding to the quantization level value 0 are stored in the respective buffer memories for the blocks. Referring to the count values of the buffer memories and the quantization characteristic symbols in the quantization characteristic selection memory unit 34 for every block, the quantization characteristic decision unit 33 determines the quantization characteristic to be next used, so that the quantization characteristic symbol for the relevant block is updated in the quantization characteristic selection memory unit.

Alternatively, the quantization level value counter 32 may count a particular value other than the quantization level value 0. Furthermore, the following method may be employed: The quantization level value counter 32 may be provided with several counters, the number of which are suitably selected according to the quantization step number, so that it counts every quantization level value. The quantization characteristic decision unit 33 determines the quantization characteristic to be next used for the relevant block from the distribution of the count values of each quantization level value. In this case, the percentage of generation on the horizontal axis in Table 1 would represent the fluctuation of quantization level value in a block.

The encoding and decoding process described with reference to FIGS. 1, 2 and 3 is carried out individually for each color component of a color picture.

Therefore, in the case where all of the color components are processed simultaneously, the encoders and the decoders, which have quantization characteristics suitable for the color components, respectively, must be provided for as many color components of a color picture. In the case where the color components are processed one after another, the same encoder and decoder can be used, but the quantization characteristics must be changed so as to be suitable for the respective color components.

Figure 4:
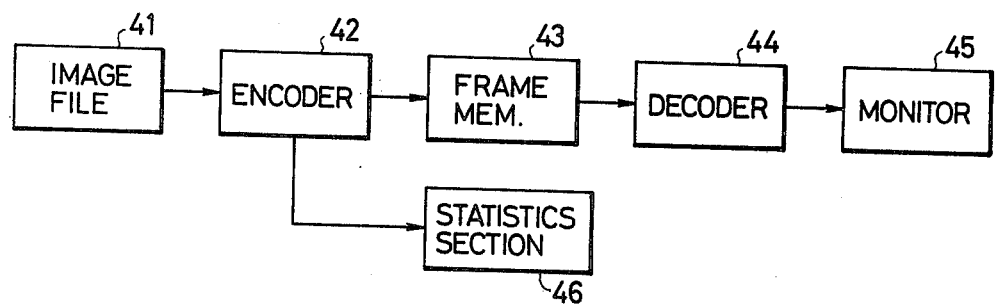
FIG. 4 is a block diagram showing an image simulator which is used to perform simulation according to the invention.

The effects of the invention which are obtained through simulation will be described in conjunction with the aforementioned luminance component W. FIG. 4 is a block diagram showing a simulator which is used to perform the simulation of the invention. In FIG. 4, reference numeral 41 designates an image file; 42, an encoding section (as was described in reference to FIG. 1, (a) and FIG. 3); 43, a frame memory (corresponding to the transmission line 1 in FIG. 1) for accumulating encoded images; 44, a decoding section (as was described in reference to FIG. 1, (b) and FIG. 3); 45, a television monitor for displaying a reproduced image; and 46, a statistics section for calculating picture entropy ($H = P_i \cdot \log_2 P_i$, where $P_i$ is the generation probability of each quantization step) and the frequency of use of each quantization characteristic.

When a picture image was used as an input picture image in which a picture and a document are mixed in a manner such that the picture occupies half of the area of the picture image and the document occupies the remaining area, the resultant data were as follows: In the simulation of the picture image, the outputs of the statistics section 46 were as indicated in Table 2(a) and Table 2(b) below.

Table 2(a) shows the entropies of the picture region and the document region in the case where each quantization characteristic is employed independently or adaptively. In this case, the K factor is four (4); that is, a one-dimensional estimation is carried out every four lines, and a two-dimensional estimation is carried out for the remaining lines.

Table 2(b) shows the frequencies of use of each of the quantization characteristics in the case where each quantization characteristic is employed adaptively.

In Tables 2(a) and 2(b), the quantization characteristic symbols are the same as those in FIG. 2, and adaptive quantization is performed under the conditions in Table 1.

TABLE 2(a)

| Quantization characteristic symbol | 1 | 2 | 3 | 4 | Adaptive |
|---|---|---|---|---|---|
| Picture | 1.97 | 1.26 | 0.72 | 0.37 | 1.28 |
| Document | 2.05 | 1.81 | 1.36 | 0.86 | 1.47 |
| | | | | | (bits/picture element) |

TABLE 2(b)

| Quantization characteristic symbol | 1 | 2 | 3 | 4 |
|---|---|---|---|---|
| Picture | 14.8 | 24.6 | 9.9 | 0.7 |
| Document | 21.8 | 8.9 | 9.0 | 10.3 |
| | | | | (%) |

As is apparent from the table, the use of a quantization characteristic with a larger quantization step interval reduces the entropy and increases the compression effect, but lowers the picture quality greatly.

In the case of the picture portion, the quantization characteristic symbol (hereinafter referred to merely as "a symbol", where applicable) "2" may be used for the region of the picture where abrupt variation exists; however the use of the symbol "2" significantly degrades the picture quality of the region of the picture where smooth variation exists. In the case of the document, the picture quality is sufficiently high even with the symbol "3", and the use of the symbol "1" cannot respond to abrupt variation, thus providing a blurred image.

Therefore, if the symbol "2" is employed for the entire area of the input picture image in order to improve the average picture quality thereof, then in the case of the picture, the quantization provides insufficient picture quality for the region of the picture where variation is smooth, and in the case of the document, the quantization is compressionally inefficient. In this case, the average entropy is 1.54 bit/picture element.

On the other hand, in the invention, a picture image is divided so that quantization characteristic adaptive to the local features of the picture image are employed. Therefore, the average entropy can be reduced to 1.37 bits/picture element which is quite different from the average obtained above. Furthermore, the resultant image is, in its entirety, excellent in compression effect.

It is apparent from Table 2(b) that, in the case where the quantization characteristic is employed adaptively as described above, the symbols "1" and "2" are relatively frequently used for the picture, the symbol "1" is frequently used for a document (because blank portions occupy the larger part of the document), and the symbols "2", "3" and "4" are about equally used for characters. It is also apparent from Table 2(b) that, with the degree of pattern complexity in the picture image, the frequency of use of the symbols "3" and "4" is increased.

As is apparent from the above description, the adaptive quantizer according to the invention, being free from the instability in quantization characteristic selection which is involved in the conventional system, operates stably with the result that the resultant image is less degraded. Furthermore, as quantization is carried out in agreement with the local features of the picture, according to the invention, the entire picture can be encoded with very high efficiency, and a system high in compression effect can be realized. Especially for a picture image in which a document and a picture are mixed, or, more generally, where a portion of abrupt density variation and a portion of moderate density variation are mixed, a greatly improved effect, which cannot be obtained with the conventional system, can be provided according to the invention.

The invention is applicable not only to image transmission but also to a layout scanner. In the layout scanner, a large amount of image data are stored, and image composition, color correction, rectilinear transformation and other image processing is carried out by a computer, to reduce the number of makeup steps. The invention is greatly effective in reducing the quantity of memory for storing the large amount of image data, without degrading the image quality.

What is claimed is:

1. An adaptive quantizer, for which a color image signal is color-separated into a plurality of color components to obtain an input picture element value for each color component of each picture element, and said input picture element values are divided into blocks consisting of a plurality of adjacent picture element values for each color component, comprising:
   means (11) for obtaining estimation error between said input picture element value and a quantized estimation value of said input picture element value;
   a quantizer (31) for quantizing said estimation error by using a selected quantization characteristic from one of a plurality of quantization characteristics provided for each color component and having quantization steps suitably determined for a respective color component;
   a quantization characteristic determining unit (32, 33) receiving the output of said quantizer for determining a quantization characteristic to be used for the next block according to the distribution of quantization level values provided when said estimation error in one block is quantized according to said selected quantization characteristic;
   a quantization characteristic selector (35) receiving an output of said quantization characteristic determining unit for selecting said selected quantization characteristic; and
   means (14, 15) for estimating a quantized estimation value of said input picture element value from a plurality of quantized estimation errors of other input picture element values.

2. An adaptive quantizer as claimed in claim 1, wherein
   for each color component and for each line in a picture image, said input picture elements are divided into m blocks each consisting of a plurality of picture elements;
   m quantization characteristic selection memories (34) are provided in correspondence to said m blocks;
   for each block in a line to be quantized, said quantization characteristic to be used for the next line according to said distribution of quantization level values is determined by said quantization characteristic determining unit, so that quantization characteristic symbols are stored at relevant addresses in said quantization characteristic selection memories; and
   said quantization characteristic selector selects a quantization characteristic for a respective block by referring to said quantization characteristic symbols which have been stored in said respective addresses in said quantization characteristic selection memories.

3. An adaptive quantizer as claimed in claim 1 or 2, wherein
   said quantization characteristic determining unit for each color component, determines a quantization characteristic for the next block or the same block of the next line according to the distribution of quantization level values in one block, said determination in being such that, when a distribution d of quantization level values in a relevant block is larger than a threshold value $\alpha$, a quantization characteristic larger in quantization step interval than the quantization characteristic used for the present block is selected, and such that when said distribution d is smaller than a threshold value $\beta$, a quantization characteristic smaller in quantization step interval than the quantization characteristic used for the present block is selected, and such that when said distribution d is between said threshold values $\alpha$ and $\beta$, the quantization characteristic used for the present block is selected.

4. An adaptive quantizer as claimed in claim 1 or 2, wherein said quantization characteristic determining unit successively determines said quantization for each color component of said image, said quantization characteristics being set individually for each color component.

5. An adaptive quantizer as claimed in claim 1, wherein said quantization characteristic determining unit determining said distribution of quantization level values comprises quantization level value counter means (32) for counting the relative number of occurrences of a particular quantization level value.

6. An adaptive quantizer as claimed in claim 5, wherein said quantization level value counter means further comprises a plurality of buffer memories (34) equal in number to said blocks, and count values corresponding to said particular level value are stored in said memories for said blocks.

7. An adaptive quantizer as claimed in claim 1, wherein said quantization characteristic determining unit simultaneously determines said quantization for each of said color components, said quantization characteristics being determined individually according to each color component.

* * * * *